United States Patent
Taylor et al.

(10) Patent No.: US 9,586,440 B2
(45) Date of Patent: Mar. 7, 2017

(54) CONTAINER WHEEL SYSTEM

(71) Applicant: Process4, Inc., Chagrin Falls, OH (US)

(72) Inventors: Curtis P. Taylor, Chagrin Falls, OH (US); Matthew G. Hanson, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 0 days.

(21) Appl. No.: 14/737,071

(22) Filed: Jun. 11, 2015

(65) Prior Publication Data

US 2015/0367678 A1 Dec. 24, 2015

Related U.S. Application Data

(60) Provisional application No. 62/014,951, filed on Jun. 20, 2014.

(51) Int. Cl.
*B60B 15/26* (2006.01)
*B65F 1/14* (2006.01)

(52) U.S. Cl.
CPC .......... *B60B 15/266* (2013.01); *B65F 1/1473* (2013.01)

(58) Field of Classification Search
CPC ..... B60B 15/26; B60B 15/263; B60B 15/266; B60B 7/00; B60B 7/08; B60B 11/00; B65F 1/1473
USPC ........................................................ 152/185
See application file for complete search history.

(56) References Cited

U.S. PATENT DOCUMENTS

| | | | | |
|---|---|---|---|---|
| 1,085,154 A | * | 1/1914 | Newsom | B60B 7/00 301/37.101 |
| 1,755,133 A | * | 4/1930 | Rowe | B62D 43/005 206/304.1 |
| 2,348,256 A | * | 5/1944 | Hollis | B60C 27/16 152/185 |
| 5,439,727 A | * | 8/1995 | Riggs | B60B 7/00 150/154 |
| 6,499,591 B1 | * | 12/2002 | Rizzo | B60B 7/0053 150/154 |
| 7,478,723 B2 | * | 1/2009 | Spater | B62D 43/005 206/304.1 |
| 8,714,220 B2 | * | 5/2014 | Tso | F16H 55/171 152/375 |
| 2003/0038528 A1 | * | 2/2003 | Kim | A63C 17/22 301/37.101 |
| 2005/0194774 A1 | * | 9/2005 | Romano | B60B 7/00 280/762 |
| 2007/0062001 A1 | * | 3/2007 | Bushey | B60B 7/00 16/35 R |
| 2012/0234446 A1 | * | 9/2012 | Brown | A63C 17/22 152/375 |
| 2012/0305152 A1 | * | 12/2012 | Son | B60C 27/066 152/185 |
| 2014/0042797 A1 | * | 2/2014 | Pillow | B60B 37/10 301/64.706 |

FOREIGN PATENT DOCUMENTS

| | | | | | |
|---|---|---|---|---|---|
| DE | | 670752 C | * | 1/1939 | ............. B60B 15/26 |
| DE | | 9209768 U1 | * | 9/1992 | |
| FR | | 2616352 A1 | * | 12/1988 | ........... A63H 17/262 |

* cited by examiner

*Primary Examiner* — Kip T Kotter
(74) *Attorney, Agent, or Firm* — Fay Sharpe LLP (57) ABSTRACT

An improved wheel system that can be connected to existing wheels of a container to provide additional stability and/or ease of use during the movement of the container.

17 Claims, 6 Drawing Sheets

CONTAINER WHEEL SYSTEM

The present invention claims priority on U.S. Provisional Application Ser. No. 62/014,951 filed Jun. 20, 2014, which is incorporated herein by reference.

BACKGROUND OF THE INVENTION

The present invention is directed to a wheel system that can be used on or with a container, more particularly to a wheel system that provides additional stability and/or ease of use during the movement of the container, and even more particularly to a wheel system that can be connected to existing wheels of a container to provide additional stability and/or ease of use during the movement of the container.

Wheels on containers (such as trash container) that are commonly placed on the container typically have a narrow wheel base. Also, the width of the wheels is typically narrow. As such, when such containers are rolled on the wheels, the container has a tendency to be unstable and tip to a side when being rolled. Also, when the container is being pulled over grass, snow, soft ground surfaces, etc., the narrow wheels and/or the narrow wheel base makes it difficult to pull the container over such surfaces, especially when the container is weighted and/or full.

In view of the current state of wheeled containers, there is a need to improve the wheel system of a container to make it easier and more stable to pull over a variety of surfaces.

SUMMARY OF THE INVENTION

The present invention is directed to a wheel system that can be connected to existing wheels of a container to provide additional stability and/or ease of use during the movement of the container. The wheel system can be configured to be removably connected to existing wheels on a container; however, this is not required. The wheel system of the present invention is configured to increase the wheel width and/or increase the wheel base of the existing wheel on a container. The wheel system can be made from a variety of materials (e.g., plastic, rubber, metal, composite material, ceramic materials, fiber-reinforced materials, etc.). The size or the wheel of the wheel system is non-limiting. The wheels of the wheel system can include a non-smooth surface to improve traction of the wheels over a surface; however, this is not required. When the wheels include a non-smooth surface, the configuration of the surface is non-limiting.

In one non-limiting aspect of the present invention, the wheel system includes a wheel cover that is designed to at least partially fit about an existing wheel on a container such as a trash container. The width of the wheel cover is typically greater than the existing wheel such that when the wheel cover is connected to the existing wheel, the wheel cover creates a wider wheel base. The wider wheel base results in improved stability of the container when being rolled and also improves the ease with which that container can be rolled over various types of surfaces (e.g., grass, snow, soft ground surfaces, dirt surfaces, gravel surfaces, wet surfaces, etc.) that can be difficult to traverse with traditional narrower wheels. The materials used to form the wheel cover are non-limiting (e.g., plastic, rubber, composite materials, metal, etc.). The width of the wheel cover is also not limiting. Generally, the width of the wheel cover is at least about 10% greater in width than a width of the original wheel on the container, typically about 10%-1000% greater in width than a width of the original wheel on the container, and more typically about 50%-200% greater in width than a width of the original wheel on the container; however, other widths of the wheel cover can be used. The diameter of the wheel cover is selected so that when the wheel cover is secured to an existing wheel on a container, the wheel cover can still rotate with the wheel. A too-large diameter of the wheel cover may prevent insertion of the wheel cover on the wheel and/or result in the outer surface of the wheel cover contacting an existing structure on the container which thereby interferes with the rotation of the wheel cover and wheel. In one non-limiting embodiment, the diameter of the wheel cover is about 0.1-4 inches greater in diameter than a diameter of an existing wheel on the container, typically about 0.25-2 inch greater in diameter than a diameter of an existing wheel on the container, and more typically about 0.25-1 inch greater in diameter than a diameter of an existing wheel on the container; however, other diameters of the wheel cover can be used.

In another and/or alternative non-limiting aspect of the present invention, the wheel cover includes a cavity that is designed to telescopically receive at least a portion of a wheel on a container. In one non-limiting arrangement, the cavity is designed to telescopically receive at least a majority of a wheel on a container (e.g., 51-100% and all percentage values and ranges therebetween); however, this is not required.

In still another and/or alternative non-limiting aspect of the present invention, the wheel cover is connected to an existing wheel of a container such that the wheel cover and existing wheel simultaneously move together; however, this is not required. The wheel cover can be connected to the existing wheel by a number of means (e.g., adhesive, friction fit, latch arrangement, rivet, screw, pin, etc.). Generally, the wheel cover is rigidly connected to the existing wheel; however, this is not required. In another and/or alternative embodiment of the invention, the inside surface of the cavity of the wheel cover includes one or more engagement members (e.g., tapered regions, ridges, grooves, ribs, etc.) that are designed to engage corresponding grooves in the existing wheel when the existing wheel is inserted at least partially into the cavity of the wheel cover. The engagement members can be configured to facilitate in the engagement members into the wheel grooves; however, this is not required. As can be appreciated, other configurations of the engagement members can be used to permanently or releasably secure the wheel cover to the existing wheel. The inside surface of the cavity of the wheel cover can optionally include a stop that limits the distance into which the existing wheel can be inserted into the cavity of the wheel cover; however, this is not required. Such a stop, when used, can be configured in many different ways. The depth of the cavity of the wheel cover can optionally be selected so that the side wall of the cavity functions as the stop of the wheel when being inserted into the cavity; however, this is not required.

In yet another and/or alternative non-limiting aspect of the present invention, the side wall of the cavity of the wheel cover can optionally include an opening. The opening, when used, is used to receive a connector that is used to secure the wheel cover to the wheel axial; however, this is not required. The outer side wall of the wheel cover can be flush with the side of the wheel, or have an outer cavity. The formation of the outer cavity can be used to provide structural integrity and strength to the wheel cover; however, this not required. The outer surface of the wheel cover can optionally include grooves and/or other structures to improve the traction of the wheel cover on a ground surface; however, this is not required. The outer surface of the wheel cover can optionally include a material (e.g., rubber, etc.) that improves the traction of the wheel cover on a ground surface; however, this is not required.

In still yet another and/or alternative non-limiting aspect of the present invention, the wheel covers can be inflatable; however, this is not required. The material used to form the inflatable wheels is non-limiting. The wheel can optionally include a valve stem to insert and remove gas (e.g., air, nitrogen, etc.) from the wheel. The inflation of the wheel can be used to increase the size/width of the wheel. The inflatable wheel can also facilitate in movement of the wheel over rough surfaces due to the flexibility of the wheel; however, this is not required. The size, shape, materials and configuration of the inflatable wheel are non-limiting. The inflatable wheel can include a fixed-size rim that is designed to mount to the wheel axial and be connected to the inflatable portion of the wheel; however, this is not required.

In another and/or alternative non-limiting aspect of the present invention, the wheel cover can be connected to and/or removed from an existing wheel or wheel member on a container by screwing the wheel cover on or off the existing wheel or wheel member. The existing wheel or wheel member includes a threaded outer surface that is designed to engage with a corresponding threaded inner surface of the wheel cover so that the wheel cover can be threaded onto the existing wheel or wheel member. The configuration of the threaded surface is non-limiting. The wheel cover can be fully threaded onto the existing wheel or wheel member or be partially threaded on to the existing wheel or wheel member. The partial threading can be used to increase the width of the wheel base of the wheel system. As can be appreciated, other arrangements can be used to enable the wheel cover to be adjustably connected to an existing wheel or wheel member to enable adjustment of the wheel base. The size, shape, configuration and materials of the existing wheel, wheel member and wheel cover are non-limiting.

In still another and/or alternative non-limiting aspect of the present invention, the wheel cover can be a flexible member that is configured to be fitted over a wheel. The materials that can be used are thermoplastic elastomers or other durable and flexible materials. The outer surface of the wheel cover can optionally include ribs to facilitate in the traction of the wheel cover; however, this is not required. The size, shape, configuration and materials of the wheel cover are non-limiting. The inner surface of the wheel cover can include a thread or other members that are used to facilitate in the gripping of the wheel cover to an existing wheel when the wheel cover is fitted about the existing wheel; however, this is not required. A hub cap can optionally be used with the wheel cover; however, this is not required.

One non-limiting object of the present invention is the provision of a wheel cover that provides additional stability and/or ease of use during the movement of the container.

In another and/or alternative non-limiting object of the present invention is the provision of a wheel cover configured to be connected to an existing wheel of a container to provide additional stability and/or ease of use during the movement of the container.

In still another and/or alternative non-limiting object of the present invention is the provision of a wheel cover configured to increase the wheel width and/or increase the wheel base of the existing wheel on a container.

In yet another and/or alternative non-limiting object of the present invention is the provision of a wheel cover configured to be removably connected to existing wheels on a container.

In still yet another and/or alternative non-limiting object of the present invention is the provision of a wheel cover configured to increase the wheel width and/or increase the wheel base of the existing wheel on a container.

In another and/or alternative non-limiting object of the present invention is the provision of a wheel cover configured to include a non-smooth surface to improve traction of the wheels over a surface.

In still another and/or alternative non-limiting object of the present invention is the provision of a wheel cover configured to at least partially fit about an existing wheel on a container such as a trash container.

In yet another and/or alternative non-limiting object of the present invention is the provision of a wheel cover configured to have a width that is greater than the existing wheel.

In still yet another and/or alternative non-limiting object of the present invention is the provision of a wheel cover configured to have a diameter so that when the wheel cover is secured to an existing wheel on a container, the wheel cover can still rotate with the wheel.

In another and/or alternative non-limiting object of the present invention is the provision of a wheel cover configured to have a cavity designed to telescopically receive at least a portion of a wheel on a container.

In still another and/or alternative non-limiting object of the present invention is the provision of a wheel cover configured to connect to an existing wheel of a container such that the wheel cover and existing wheel simultaneously move together.

In yet another and/or alternative non-limiting object of the present invention is the provision of a wheel cover configured to have a cavity having an inside surface that includes one or more engagement members designed to engage corresponding grooves in an existing wheel when the existing wheel is inserted at least partially into the cavity of the wheel cover.

In still yet another and/or alternative non-limiting object of the present invention is the provision of a wheel cover configured to have a cavity that has an inside surface that includes a stop that limits the distance into which the existing wheel can be inserted into the cavity of the wheel cover.

These and other objects, features and advantages of the present invention will become apparent from the subsequent description taken in conjunction with the accompanying drawings.

BRIEF DESCRIPTION OF THE FIGURES

Reference may now be made to the drawings, which illustrate various non-limiting embodiments that the invention may take in physical form and in certain parts and arrangements of parts wherein.

DETAILED DISCUSSION OF NON-LIMITING EMBODIMENT

Referring now to the drawings, wherein the showing is for the purpose of illustrating non-limiting embodiments of the invention only and not for the purpose of limiting the same, as illustrated in FIGS. 1-6 there is illustrated a wheel cover 100 that is configured to fit at least partially about an existing wheel 20 of a container 10. The container can be any type of container and is not limited to any size, shape, configuration or material. One non-limiting type of container is a garbage or refuse container. The container includes a cavity (not shown) configured to hold various types of items. The container 10 is illustrated as having two wheels 20 that are located at the bottom, side, rear region of the container; however, this is not required. As can be appreciated, the container can have more than two wheels. The wheels are generally rotatably connected to the container by an axle or other type of arrangement (not shown) that allows the wheels to be secured to the container and rotate relative to the container. The operation of the wheels and connection of the wheels to a container are well known in the art and will not be further described herein.

Figure 1:
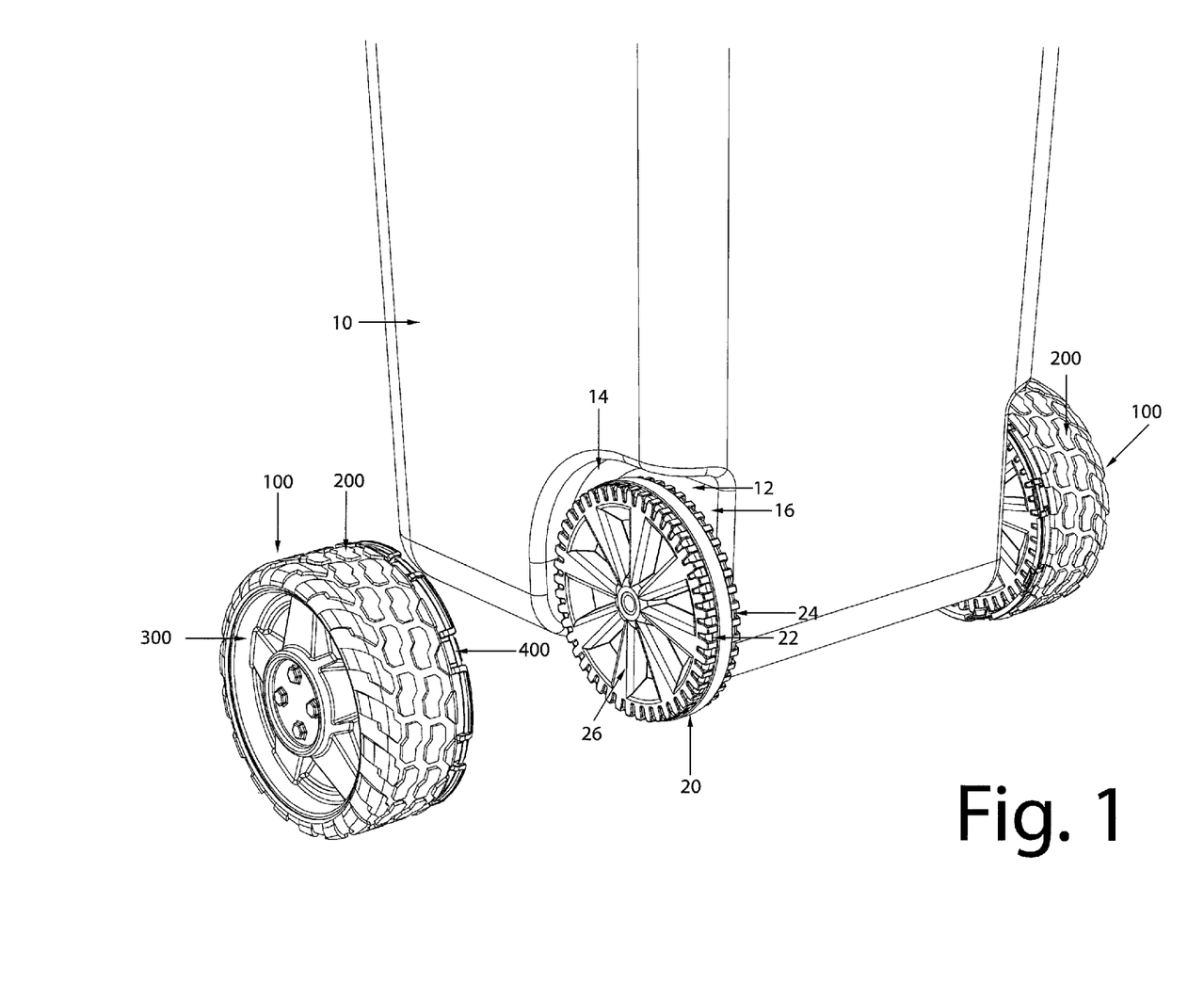
FIG. 1 is review perspective view of a lower region of a container having two existing wheels wherein one of the existing wheels is inserted into a wheel cover in accordance with the present invention and the other existing wheel of the container is absent a wheel cover of the present invention.
Figure 2:
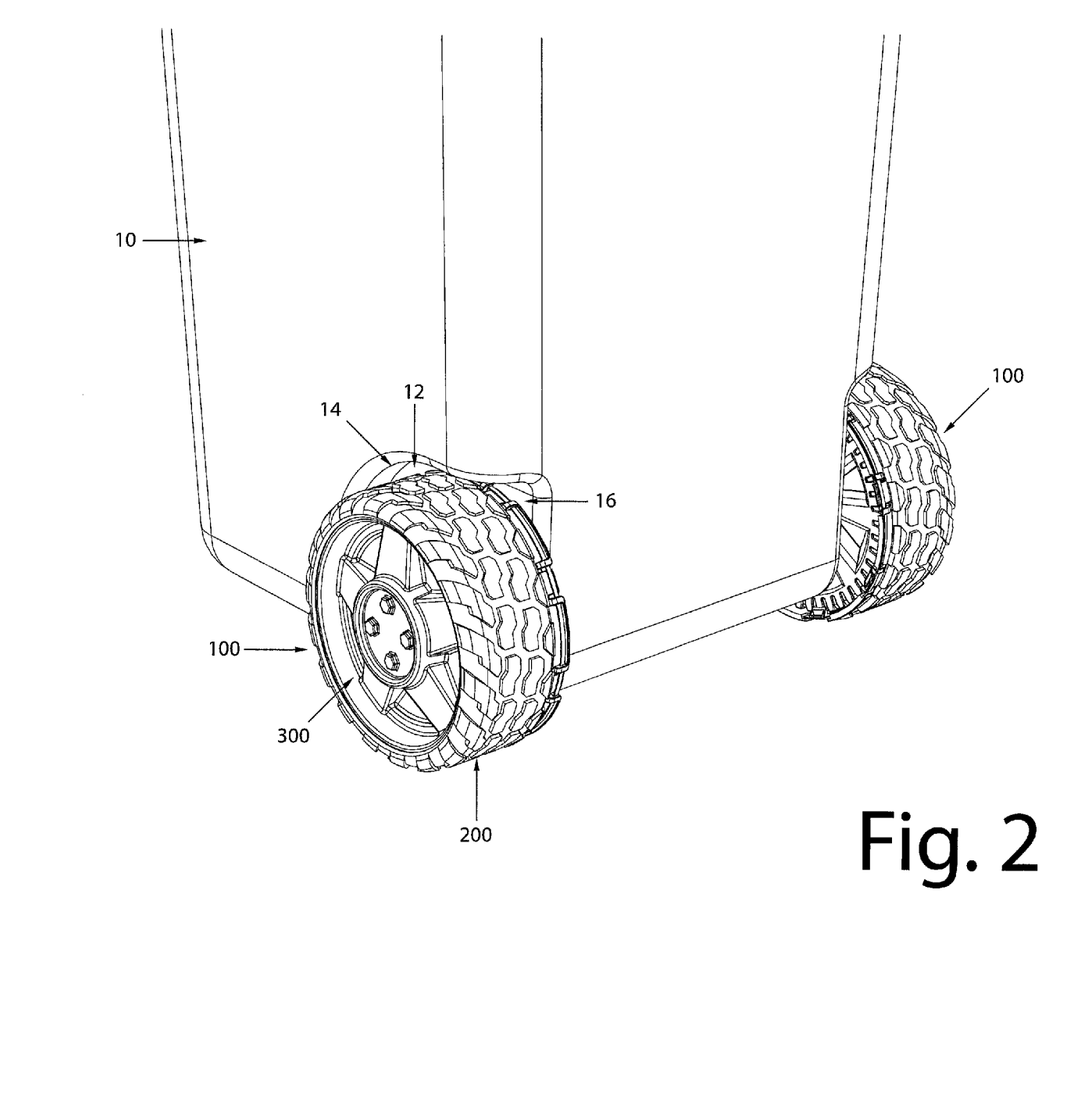
FIG. 2 is review perspective view of a lower region of the container of FIG. 1 wherein both of the existing wheels are inserted into a wheel cover in accordance with the present invention.

The two wheels are illustrated as having a similar shape and size; however, this is not required. The wheels 20 are positioned in a recessed region 12 of the container; however, this is not required. The wheels are sized such that the top outer surface of the wheel is spaced from the top inner surface 14 of the recessed region (as illustrated in FIGS. 1 and 2) so that the top surface of the wheel does not contact the top inner surface of the recessed region during the rotation of the wheels. The spacing of the top surface of the wheels to the top inner surface of the recessed region is generally about 0.25-2.5 inches; however, other spacing distances can be used. The wheel is also generally spaced from the side wall 16 of the recessed region so that the side of the wheel does not contact the side wall of the recessed region during the rotation of the wheels.

Each of the wheels 20 includes a tread 22 that has one or more slots 24. The design of the tread and the number of slots or other types of gripping arrangements on the tread are non-limiting. The wheel is also illustrated as including a plurality of spokes 26; however, this is not required.

As illustrated in FIGS. 1 and 2, the wheel cover is configured to at least partially fit about existing wheel 20 on container 10. The width of the wheel cover is typically greater than the existing wheel such that when the wheel cover is connected to the existing wheel, the wheel cover creates a wider wheel base. The wider wheel base results in improved stability of the container when being rolled and also improves the ease with which that container can be rolled over various types of surfaces (e.g., grass, snow, soft ground surfaces, dirt surfaces, gravel surfaces, wet surfaces, etc.) that can be difficult to traverse with traditional narrower wheels. The materials used to form the wheel cover are non-limiting (e.g., plastic, rubber, composite materials, metal, etc.). The width of the wheel cover is also not limiting. Generally, the width of the wheel cover is about 50%-300% greater in width than a width of wheel 20. The diameter of the wheel cover is selected so that when the wheel cover is secured to wheel 20, the wheel cover can still rotate with the wheel. A too-large diameter of the wheel cover may prevent insertion of the wheel cover on the wheel and/or result in the outer surface of the wheel cover contacting an existing structure on the container which thereby interferes with the rotation of the wheel cover and wheel. The diameter of the wheel cover is about 0.1-1.5 inches greater in diameter than a diameter of wheel 20.

Figure 4:
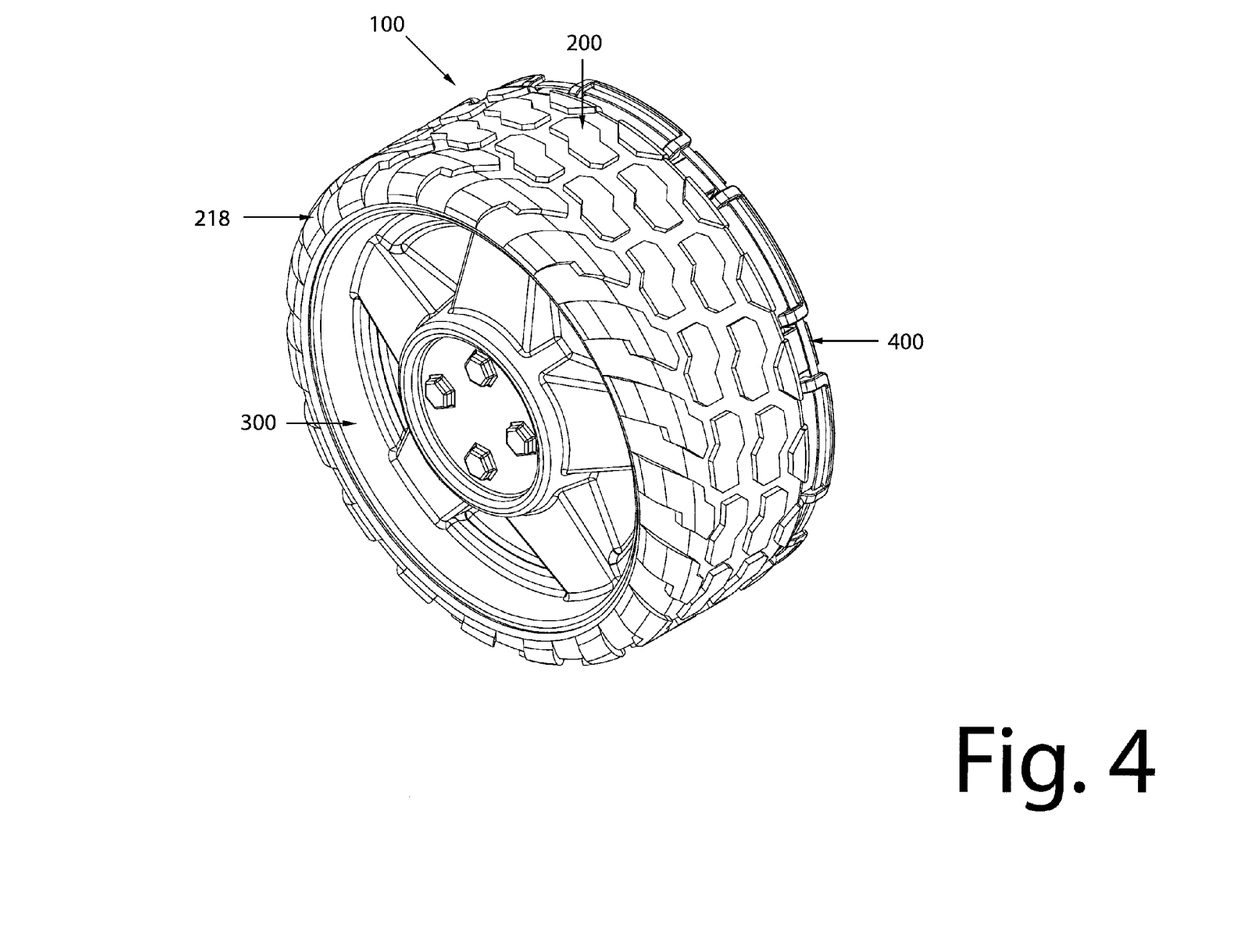
FIG. 4 is an opposite side perspective view of the wheel cover in accordance with the present invention.
Figure 5:
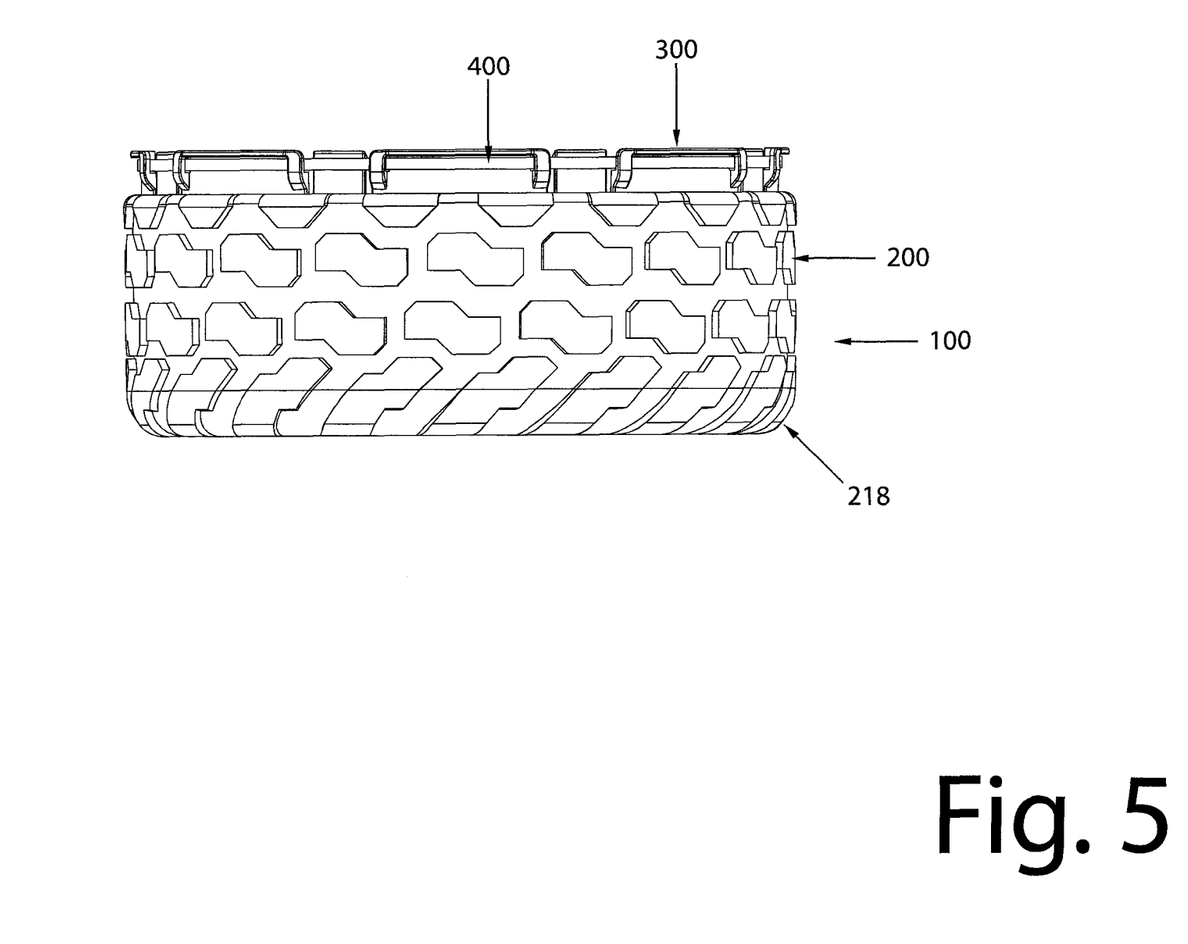
FIG. 5 is a front plan view of the wheel cover in accordance with the present invention; and, FIG. 6 is an exploded view of the wheel cover in accordance with the present invention.
Figure 6:
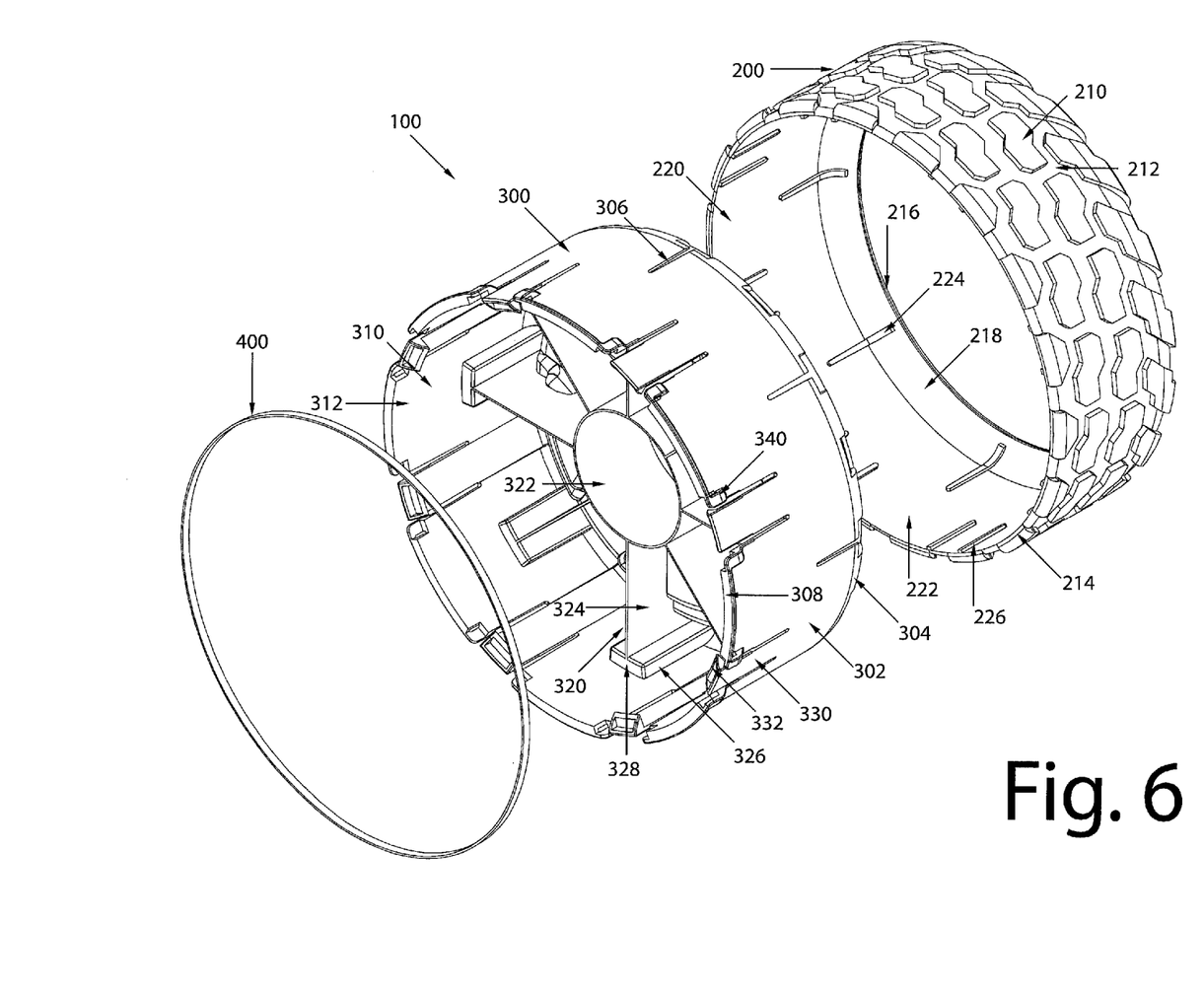

Referring now to FIGS. 3-6, the wheel cover is formed of three parts, namely wheel shell 200, wheel frame 300 and securing band 400. As best illustrated in FIG. 6, the wheel shell 200 has a generally circular cross-sectional shape and generally circular outer profile; however, this is not required. The outer surface 210 of the wheel shell can be smooth or include a non-smooth surface. As illustrated in FIGS. 1-6, the outer surface of the wheel shell has a non-smooth surface formed from a plurality of grooves 212 in the outer surface. The shape, size and number of grooves are non-limiting. As can be appreciated, the non-smooth surface can be also or alternatively formed by other structures (e.g., ribs, studs, spikes, openings, slots, etc.) in the outer surface of the wheel shell. The non-smooth surface can be used to facilitate in the outer surface, providing improved gripping to a surface as the container is moved over the surface; however, this is not required.

The wheel shell includes a shell cavity 220 that has a generally circular shape; however, this is not required. The shell cavity opening at the inner edge 214 of the wheel shell is illustrated as having a larger cross-sectional area than a shell cavity opening at the outer edge 216 of the wheel shell; however, this is not required. As can be appreciated, the shell cavity opening at the inner edge 214 of the wheel shell can have the same cross-sectional area as the shell cavity opening at the outer edge 216 of the wheel shell. As can also be appreciated, the shell cavity opening at the outer edge of the wheel shell can be eliminated. As best illustrated in FIG. 6, the outer surface of the wheel shell at or near the outer edge curves or slopes toward the central axis of the wheel shell forming an outer lip 218, thereby resulting in the shell cavity opening at the inner edge 214 of the wheel shell having a larger cross-sectional area than the shell cavity opening at the outer edge 216 of the wheel shell. The sloped or curved region constitutes less than 50% of the width of the wheel shell, typically less than 30% of the width of the wheel shell, and more typically less than 25% of the width of the wheel shell. The inner surface 222 of the shell cavity can include one or more structural ribs 224 to provide additional rigidity and/or strength to the wheel shell; however, this is not required. The shape, size and configuration of the structural ribs 224 are non-limiting. As can be appreciated, the one or more structural ribs can be used to engage the wheel frame 300 to at least partially secure the wheel frame in the shell cavity of the wheel shell and/or to inhibit or prevent the wheel frame to rotate in the shell cavity relative to the wheel shell; however, this is not required.

As illustrated in FIG. 6, the shell cavity of the wheel shell optionally includes guide structures 226. The guide structures are in the form of ribs that are located at or near the inner edge of the wheel shell. The shape, size and configuration of the guide structures are non-limiting. The one or more guide structures can be used to engage the wheel frame 300 to at least partially secure the wheel frame in the shell cavity of the wheel shell and/or to inhibit or prevent the wheel frame from rotating in the shell cavity; however, this is not required. As can be appreciated, on or more guide structures can be used to provide additional rigidity and/or strength to the wheel shell; however, this is not required.

Figure 3:
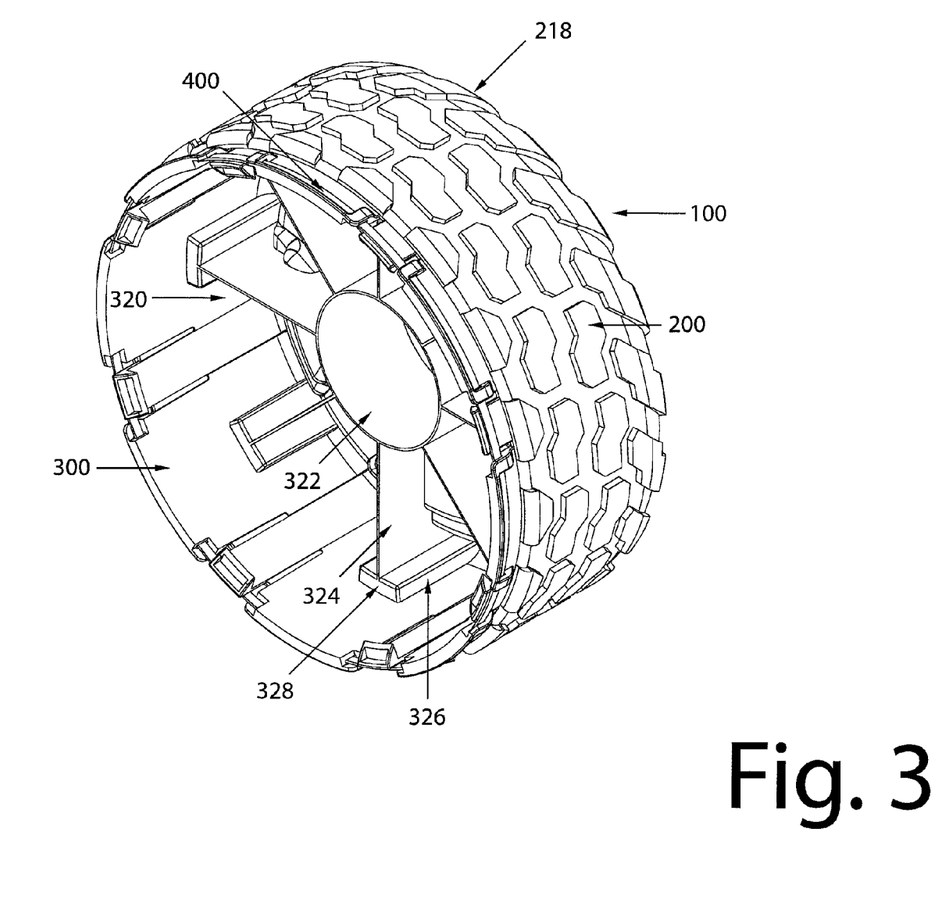
FIG. 3 is a perspective view of the wheel cover in accordance with the present invention.

Referring again to FIG. 6, the wheel frame 300 is illustrated as having a generally circular cross-sectional shape; however, this is not required. The outer diameter and/or cross-sectional area of the wheel frame is selected to be less than the diameter and/or cross-sectional area of the shell cavity opening at the inner edge of the wheel shell so that the shell cavity of the wheel shell can telescopically receive at least a portion of the wheel frame as illustrated in FIGS. 3-5. The outer surface 302 of the wheel frame can be smooth or non-smooth. The front edge 304 of the wheel frame has a tapered surface that corresponds to the sloped or curved inner surface of the shell cavity at or near the outer edge of the wheel shell; however, this is not required. The outer surface of the wheel frame includes one or more guide slots 306 that are designed to receive structural ribs 224 in shell cavity 220 of wheel shell 200 when the wheel frame is at least partially inserted into the shell cavity of the wheel shell. The insertion of one or more structural ribs into the one or more guide slots facilitates in securing the wheel frame in the shell cavity of the wheel shell and inhibits or prevents the wheel frame from rotating within the shell cavity. As can be appreciated, structures other than guide slots or in addition to guide slots can be used to secure the wheel frame in the shell cavity of the wheel shell and/or inhibit or prevent the wheel frame from rotating within the shell cavity.

As illustrated in FIGS. 5 and 6, the wheel frame is configured such that the full width of the wheel frame is not inserted into the shell cavity; however, this is not required. Generally, at least 50% of the width of the wheel frame is configured to be inserted into the shell cavity, typically at least 70% of the width of the wheel frame is configured to be inserted into the shell cavity, and more typically 80%-100% of the width of the wheel frame is configured to be inserted into the shell cavity.

The wheel frame includes a frame cavity 310. The frame cavity has a generally circular shape; however, this is not required. The frame cavity opening at the inner edge 308 of the wheel frame is illustrated as having a larger cross-sectional area than a frame cavity opening at the front edge 304 of the wheel frame; however, this is not required. As can be appreciated, the frame cavity opening at the inner edge of the wheel frame can have the same cross-sectional area as the frame cavity opening at the front edge of the wheel frame. As can also be appreciated, the frame cavity opening at the front edge of the wheel frame can be eliminated.

Positioned in the frame cavity is a rigidity structure 320. The shape, configuration and size of the rigidity structure are non-limiting. One non-limiting rigidity structure is illustrated in FIGS. 3, 4 and 6. The rigidity structure includes a central hub 322 and a plurality of fins or spokes 324. The fins or spokes terminate at blocks 326 that are secured to the inner surface 312 of the frame cavity. The bottom portion 328 of the blocks is spaced from inner edge 308. The bottom portion of the blocks is configured to function as a stop to wheel 20 when the wheel is at least partially inserted into the frame cavity. As can be appreciated, other or additional structures can be used to function as a stop to wheel 20 when the wheel is at least partially inserted into the frame cavity.

The wheel frame includes a plurality of flexible securing tabs 330 that are positioned at or near the inner edge 308. Each of the securing tabs includes a securing lip 332 that is configured to engage wheel 20 when the wheel is at least partially inserted into the frame cavity.

The wheel frame includes a plurality of band tabs 340 that are configured to secure the securing band 400 to the wheel frame. The securing band is configured to inhibit or prevent the flexible securing tabs from bending or flexing outwardly from the central axis of the wheel frame when the securing band is secured to the wheel frame.

As can be appreciated, the wheel shell and the wheel frame can be formed as a single piece; however, this is not required. The wheel shell, wheel frame and securing band can be formed by a variety of processes (e.g., injection molding, molds, stamping, extrusion, etc.).

The use of the wheel cover 100 will now be described. Prior to the wheel cover being inserted on wheel 20, the wheel frame is inserted into the wheel shell. As can be appreciated, an adhesive or other means can additionally be used to secure the wheel cover to the wheel frame; however, this is not required. The wheel is then inserted into the frame cavity until the wheel contacts bottom portion 328 of blocks 326 in the frame cavity of the wheel frame. The wheel frame is configured so that at least a majority of a width of the wheel is inserted into the frame cavity (e.g., 51-100%), typically at least 75% of a width of the wheel is inserted into the frame cavity, and more typically at least a 90% of a width of the wheel is inserted into the frame cavity.

As the wheel is inserted into the frame cavity, the flexible securing tabs are caused to flex outwardly until the wheel is inserted the desired amount into the frame cavity of the wheel frame. Thereafter, the flexible securing tabs flex back and the securing lip is positioned at least partially on the side of the wheel to thereby secure the wheel in the frame cavity. Securing band 400 is then positioned in the band tabs 340 on the wheel frame to inhibit or prevent the flexible securing tabs from bending or flexing outwardly from the central axis of the wheel frame and thereby inhibit or prevent the securing lip releasing from the wheel.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A wheel cover configured to be at least partially inserted on a wheel, said wheel cover comprising a wheel shell that at least partially forms a shell cavity, a wheel frame, a wheel stop to limit a distance the wheel can be inserted into said shell cavity when said wheel cover is at least partially inserted on the wheel, and a securing arrangement configured to maintain the wheel in said shell cavity, said shell cavity configured to receive at least a portion of said wheel frame, said wheel frame rigidly connected to said wheel shell such that said wheel frame is prevented from rotating in said shell cavity relative to said shell cavity, said wheel frame includes the wheel stop to limit the distance the wheel can be inserted into said shell cavity when said wheel cover is at least partially inserted on the wheel, said securing arrangement including a plurality of flexible tabs configured to releasably secure the wheel at least partially in said shell cavity.

2. The wheel cover as defined in claim 1, said wheel frame includes said securing arrangement.

3. The wheel cover as defined in claim 2, wherein said wheel stop is at least partially positioned on said wheel frame.

4. The wheel cover as defined in claim 3, wherein a frame cavity is located at or adjacent to an inner edge of said wheel frame, said frame cavity is at least partially located in said shell cavity, said frame cavity has a depth, said wheel stop spaced from said inner edge of said wheel frame such that at least a majority of a width of the wheel can be inserted into said frame cavity prior to the wheel contacting said wheel stop.

5. The wheel cover as defined in claim 2, wherein said shell cavity includes at least one rib, said wheel frame including at least one slot configured to at least partially receive said rib in said shell cavity when said wheel frame is inserted into said shell cavity, said rib configured to prevent rotation of said wheel frame relative to said wheel shell when said at least one rib is inserted into said at least one slot.

6. A wheel cover configured to be at least partially inserted on a wheel, said wheel cover comprising a wheel shell that at least partially forms a shell cavity, a wheel frame, a wheel stop to limit a distance the wheel can be inserted into said shell cavity when said wheel cover is at least partially inserted on a the wheel, a securing band, and a securing arrangement configured to maintain the wheel in said shell cavity, said shell cavity is configured to receive at least a portion of said wheel frame, said wheel frame is rigidly connected to said wheel shell such that said wheel frame is prevented from rotating in said shell cavity relative to said shell cavity, said wheel frame includes the wheel stop to limit the distance the wheel can be inserted into said shell cavity when said wheel cover is at least partially inserted on the wheel, said wheel frame includes said securing arrangement, said securing arrangement includes a plurality of flexible tabs located on said wheel frame, said securing band configured to be connected to said wheel frame, said securing band configured to inhibit movement of said flexible tabs when said securing band is connected to said wheel frame.

7. A container that includes at least one existing wheel and a wheel cover secured to said existing wheel, said existing wheel having a wheel width, said wheel cover having a wheel cover width, said wheel cover width at least 50% greater than said existing wheel width, said wheel cover configured to be at least partially inserted on said existing wheel, said wheel cover comprising a wheel shell that at least partially forms a shell cavity, a wheel frame, a wheel stop to limit a distance said existing wheel can be inserted into said shell cavity when said wheel cover is at least partially inserted on said existing wheel, and a securing arrangement configured to maintain said existing wheel in said shell cavity, said shell cavity configured to receive at least a portion of said wheel frame, said wheel frame is rigidly connected to said wheel shell such that said wheel frame is prevented from rotating in said shell cavity relative to said shell cavity, said wheel frame includes the wheel stop to limit the distance the wheel can be inserted into said shell cavity when said wheel cover is at least partially inserted on the wheel, said securing arrangement includes a plurality of flexible tabs configured to releasably secure the wheel at least partially in said shell cavity.

8. The container as defined in claim 7, wherein said wheel frame includes said securing arrangement.

9. The container as defined in claim 8, wherein said wheel stop is at least partially positioned on said wheel frame.

10. The container as defined in claim 9, wherein a frame cavity is located at or adjacent to an inner edge of said wheel frame, said frame cavity at least partially located in said shell cavity, said frame cavity has a depth, said wheel stop spaced from said inner edge of said wheel frame such that at least a majority of a width of the wheel can be inserted into said frame cavity prior to the wheel contacting said wheel stop.

11. The container as defined in claim 10, wherein said wheel stop is spaced from said inner edge a distance that is 50%-125% said width of said existing wheel.

12. The container as defined in claim 8, wherein said shell cavity includes at least one rib, said wheel frame including at least one slot configured to at least partially receive said rib in said shell cavity when said wheel frame is inserted into said shell cavity, said rib configured to prevent rotation of said wheel frame relative to said wheel shell when said at least one rib is inserted into said at least one slot.

13. The container as defined in claim 8, wherein 50-90% of a width of said wheel frame is inserted into said shell cavity.

14. A container that includes at least one existing wheel and a wheel cover secured to said existing wheel, said existing wheel having a wheel width, said wheel cover having a wheel cover width, said wheel cover width at least 50% greater than said existing wheel width, said wheel cover configured to be at least partially inserted on said existing wheel, said wheel cover comprising a wheel shell that at least partially forms a shell cavity, a wheel frame, a wheel stop to limit a distance said existing wheel can be inserted into said shell cavity when said wheel cover is at least partially inserted on said existing wheel, and a securing arrangement configured to maintain said existing wheel in said shell cavity, said shell cavity is configured to receive at least a portion of said wheel frame, said wheel frame rigidly connected to said wheel shell such that said wheel frame is prevented from rotating in said shell cavity relative to said shell cavity, said wheel frame includes the wheel stop to limit the distance the wheel can be inserted into said shell cavity when said wheel cover is at least partially inserted on the wheel, said wheel frame includes said securing arrangement, said securing arrangement includes a plurality of flexible tabs located on said wheel frame, said wheel cover includes a securing band configured to be connected to said wheel frame, said securing band configured to inhibit movement of said flexible tabs when said securing band is connected to said wheel frame.

15. A wheel cover configured to be at least partially inserted on a wheel, said wheel cover comprising a wheel shell that at least partially forms a shell cavity, a wheel frame, a wheel stop to limit a distance the wheel can be inserted into said shell cavity when said wheel cover is at least partially inserted on the wheel, a securing band, and a securing arrangement configured to maintain the wheel in said shell cavity, said shell cavity is configured to receive at least a portion of said wheel frame, said wheel frame is rigidly connected to said wheel shell such that said wheel frame is prevented from rotating in said shell cavity relative to said shell cavity, said wheel frame includes the wheel stop to limit the distance the wheel can be inserted into said shell cavity when said wheel cover is at least partially inserted on the wheel, said securing band configured to be connected to said wheel frame, said securing band configured to inhibit said securing arrangement from releasing the wheel from said shell cavity.

16. The wheel cover as defined in claim 15, wherein said securing arrangement includes a plurality of flexible tabs located on said wheel frame.

17. The wheel cover as defined in claim 16, wherein said shell cavity includes at least one rib, said wheel frame including at least one slot configured to at least partially receive said rib in said shell cavity when said wheel frame is inserted into said shell cavity, said rib configured to prevent rotation of said wheel frame relative to said wheel shell when said at least one rib is inserted into said at least one slot.

* * * * *